B. BORDEN.
PIPE THREADING TOOL.
APPLICATION FILED SEPT. 21, 1910.
1,029,662.
Patented June 18, 1912.
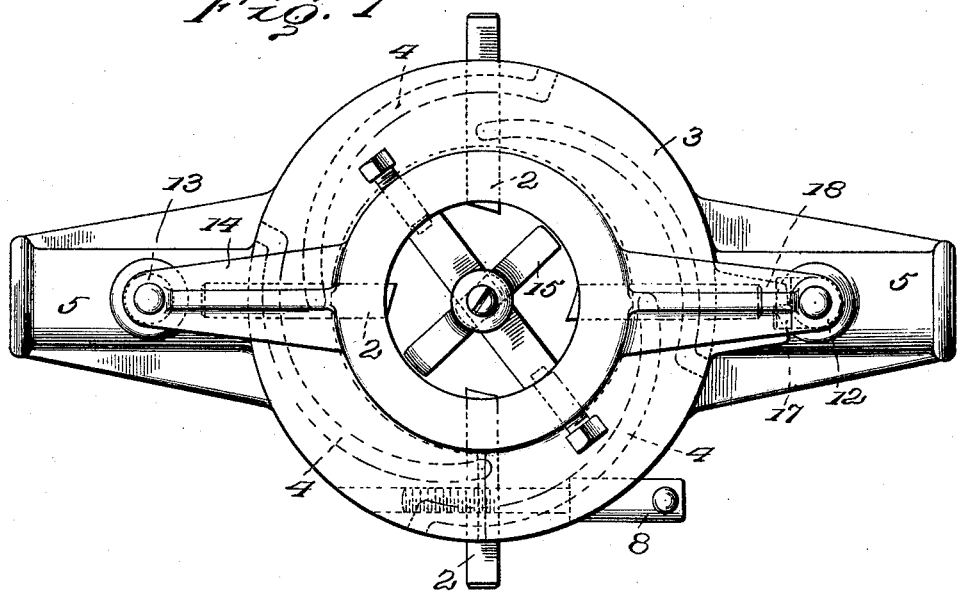
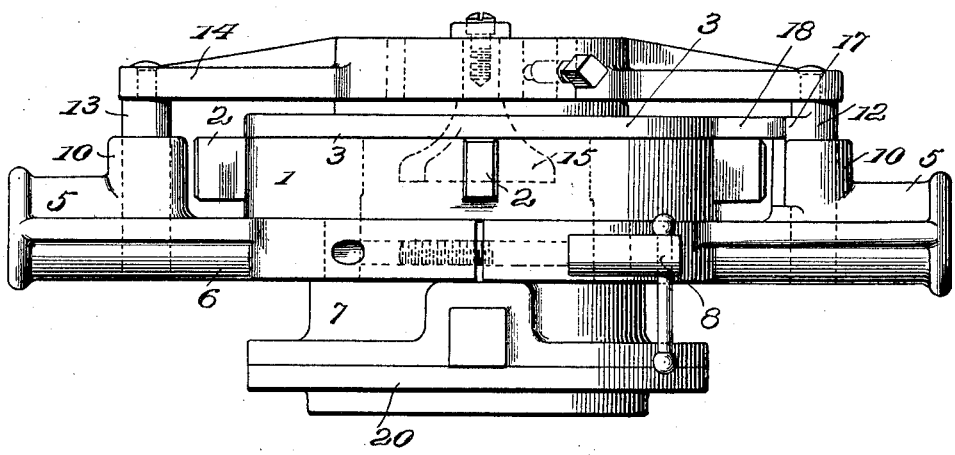
Inventor
Bradford Borden.
Witnesses
By
Attorney

UNITED STATES PATENT OFFICE.

BRADFORD BORDEN, OF TORONTO, ONTARIO, CANADA.

PIPE-THREADING TOOL.

1,029,662.  Specification of Letters Patent.  Patented June 18, 1912.

Application filed September 21, 1910. Serial No. 583,097.

*To all whom it may concern:*

Be it known that I, BRADFORD BORDEN, a resident of Toronto, in the Province of Ontario and Dominion of Canada, have invented certain new and useful Improvements in Pipe-Threading Tools; and I do hereby declare the following to be a full, clear, and exact description of the invention, such as will enable others skilled in the art to which it appertains to make and use the same.

This invention relates to that class of die stocks or pipe threading tools for cutting tapered threads and capable of being used without the employment of a work holder clamped to the pipe, and in respect to which the chaser carrier has a rotary and longitudinal movement. A tool of the character outlined is disclosed in an application for patent filed by me September 23, 1908, Serial No. 454,333.

The present invention also relates to that class of die stocks wherein the chasers are capable of being adjusted to accommodate pipes of different sizes without the employment of a second plate coöperating with the chaser-engaging plate, which second plate is connected with means which automatically controls the movement of the chaser-engaging plate and the chasers independently of their rotation with the chaser carrier. A die stock of this character is shown and described in an application for patent filed by me May 5, 1910, Serial No. 559,444.

The primary object of the present invention is to provide, in a pipe threading tool having the general characteristics above outlined, improved means whereby the chaser-engaging plate, or cam plate, and the chasers may be adjusted, to adapt the chasers to pipes of different sizes, without disengaging the chaser-engaging plate from the means which controls its independent movement, during the threading operation.

The invention will be hereinafter fully set forth and particularly pointed out in the claims.

In the accompanying drawings, Figure 1 is an end elevation. Fig. 2 is a side elevation.

Referring to the drawings, 1 designates the chaser-carrier, which is shown in the form of a circular housing having a series of radial guideways wherein are mounted chasers 2.

3 is the chaser-engaging plate, commonly termed the cam plate, which is fitted over the face of the housing, and on its inner side has eccentrically-arranged chaser-engaging means, preferably in the form of a series of cam grooves 4, which take in lugs of the chasers.

According to my present invention, the two handle sockets 5 are formed with or project laterally from an annular member 6 which is shown in the form of a split ring encircling a reduced portion 7 of chaser carrier housing 1. A lock-screw 8 is designed to bind the split ends of the ring so as to clamp the socket-carrying member to the housing. By loosening screw 8 concentric adjustment may be effected as between the chaser carrier and the socket-carrying member 6. The latter is provided with two transverse openings 10 through which pass two posts 12 and 13 which are secured at their outer ends to a cross member 14 which is extended perpendicularly of the axis of the tool, and to which is secured, at the center of the latter, a stop 15. As pointed out in my before noted applications, the purpose of this stop is to prevent the posts from partaking of the longitudinal movement of the chaser carrier. The post 12 is provided with a diagonally arranged lug 17 for taking in a slot formed in a lateral extension 18 of cam plate 3. Hence, as the die stock is rotated, in the usual manner, during its longitudinal travel the independent rotation of the cam plate will be controlled by post 12, between which latter and the chaser carrier there is a relative longitudinal movement.

I have shown at 20 a centering device which is for the purpose of properly alining the tool to the pipe, but is not intended to be clamped to the latter as in the case of a work holder.

To adjust the chasers for cutting pipes of different sizes, the operator turns screw 8 to release the socket-carrying member from the chaser carrier, and thus permit of a relative adjustment between said parts, such adjustment resulting in the radial movement of the chasers. When the latter have been properly positioned, the screw 8 is again turned to fixedly hold the socket-carrying member to the chaser carrier.

I claim as my invention:—

1. In combination with a rotatable and longitudinally-movable chaser carrier, a series of radially-arranged chasers, and a cam plate rotatable with and independently of said chaser carrier for engaging the chasers, a post engaging said cam plate to control its axial turning independently of its rotation with the chaser carrier, said post being rotatable with said chaser carrier but not partaking of its longitudinal movement, a member carrying said post, said member having handle sockets, and means for detachably locking said member to the chaser carrier.

2. In combination with a rotatable and longitudinally-movable chaser carrier, a series of radially-arranged chasers, and a cam plate rotatable with and independently of said chaser carrier for engaging the chasers, a post engaging said cam plate to control its axial turning independently of its rotation with the chaser carrier, means connected to said post for engaging the object being threaded to prevent the post from partaking of the longitudinal movement of the chaser carrier, a member carrying said post, said member having handle sockets, and means for detachably locking said member to the chaser carrier.

3. In combination with a rotatable and longitudinally-movable chaser carrier, a series of radially-arranged chasers, and a cam plate rotatable with and independently of said chaser carrier for engaging the chasers, a post engaging said cam plate to control its axial turning independently of its rotation with the chaser carrier, said post being rotatable with said chaser carrier but not partaking of its longitudinal movement, a member carrying said post comprising a split ring encircling a portion of the chaser carrier, means for clamping said split ring, and handle-sockets carried by said split ring.

4. In combination with a rotatable and longitudinally-movable chaser carrier, a series of radially-arranged chasers, and a cam plate rotatable with and independently of said chaser carrier for engaging the chasers, a post engaging said cam plate to control its axial turning independently of its rotation with the chaser carrier, a second post, a transverse member connecting said posts, a stop carried by said member for engaging the object being threaded to prevent the posts from partaking of the longitudinal travel of the chaser carrier, a member carrying said posts, said member having handle-sockets, and means for detachably locking said member to the chaser carrier.

5. In combination with a rotatable and longitudinally-movable chaser carrier, a series of radially-arranged chasers, and a cam plate rotatable with and independently of said chaser carrier for engaging the chasers, a post engaging said cam plate to control its axial turning independently of its rotation with the chaser carrier, a second post, a transverse member connecting said posts, a stop carried by said member for engaging the object being threaded to prevent the posts from partaking of the longitudinal travel of the chaser carrier, a member carrying said posts comprising a split ring encircling a portion of the chaser carrier, means for clamping said split ring, and handle-sockets carried by said split ring.

6. In combination with a rotatable and longitudinally-movable chaser carrier, a series of radially-arranged chasers, and a cam plate rotatable with and independently of said chaser carrier for engaging the chasers, a post engaging said cam plate to control its axial turning independently of its rotation with the chaser carrier, a second post, a transverse member connecting said posts, a stop carried by said member for engaging the object being threaded to prevent the post from partaking of the longitudinal travel of the chaser carrier, a member carrying said posts comprising a split ring encircling a portion of the chaser carrier, means for clamping said split ring, said split ring having transverse sockets to accommodate said posts, and handle-sockets carried by said split ring.

In testimony whereof, I have signed this specification in the presence of two subscribing witnesses.

BRADFORD BORDEN.

Witnesses:
D. S. TOVELL,
H. M. CHRISTMAN.

---

Copies of this patent may be obtained for five cents each, by addressing the "Commissioner of Patents, Washington, D. C."